US009047558B2

(12) United States Patent  
Hochstein

(10) Patent No.: US 9,047,558 B2  
(45) Date of Patent: Jun. 2, 2015

(54) PROBABILISTIC EVENT NETWORKS BASED ON DISTRIBUTED TIME-STAMPED DATA

(75) Inventor: Axel Hochstein, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 13/351,423

(22) Filed: Jan. 17, 2012

(65) Prior Publication Data

US 2013/0185232 A1    Jul. 18, 2013

(51) Int. Cl.
*G06F 15/18*    (2006.01)
*G06N 7/00*    (2006.01)

(52) U.S. Cl.
CPC ..................... *G06N 7/005* (2013.01)

(58) Field of Classification Search
CPC .................. G06N 5/04; G06F 15/18
See application file for complete search history.

(56) References Cited

U.S. PATENT DOCUMENTS

| | | | |
|---|---|---|---|
| 8,032,477 B1 * | 10/2011 | Hoffberg et al. | 706/52 |
| 8,140,454 B2 * | 3/2012 | Bullen et al. | 706/21 |
| 2003/0074142 A1 * | 4/2003 | Steeg | 702/19 |
| 2008/0294471 A1 * | 11/2008 | Gupta et al. | 705/7 |
| 2009/0171879 A1 * | 7/2009 | Bullen et al. | 706/47 |
| 2011/0145185 A1 * | 6/2011 | Wang et al. | 706/52 |
| 2011/0231246 A1 * | 9/2011 | Bhatia et al. | 705/14.43 |
| 2014/0019398 A1 * | 1/2014 | Engel et al. | 706/46 |

FOREIGN PATENT DOCUMENTS

WO    2009008783    1/2009

OTHER PUBLICATIONS

Engel et al., "Towards Proactive Event-Driven Computing", Jul. 15, 2011, DEBS 2011, pp. 125-136.*
Dimitris Margaris, "Learning Bayesian Network Model Structure from Data", May 2003, Carneige Mellon University, pp. 1-126.*
Chavira et al., "Compiling Bayesian Networks Using Variable Elimination", 2007, IJCAI, pp. 2243-2449.*
Hofmann et al., "Statistical Models for Co-occurrence Data", Feb. 1998, Massechusetts Institute of Technology Artificial Intelligence Laboratory, pp. 1-21.*
Silva et al., "The Hidden Life of Latent Variables: Bayesian Learning with Mixed Graph Models", 2009, Journal of Machine Learning Reseach, vol. 10, pp. 1187-1238.*
Sivakumar, L., "Business Event Processing with WebSphere Business Events, Part 5: Integrating Business Events with WebSphere Business Monitor", Mar. 2010, 18 pages, website address, available online at http://www.ibm.com/developerworks/websphere/library/techarticles/0812_sivakumar/0812_sivakumar.html, as of Nov. 3, 2011.

(Continued)

*Primary Examiner* — David Vincent
*Assistant Examiner* — Paulinho E Smith
(74) *Attorney, Agent, or Firm* — Ference & Associates LLC

(57) ABSTRACT

Techniques for producing probabilistic event networks (Bayesian network based representation of node dependencies, whereas nodes comprise event occurrences, explicit times of occurrences, and the context of event occurrences) based on distributed time-stamped data are disclosed. An aspect provides a method for predicting events from event log data via constructing a probabilistic event net and using the probabilistic event net to infer a probabilistic statement regarding a future event using a network inference mechanism. Other embodiments are disclosed.

29 Claims, 12 Drawing Sheets

---

Process 1: Learn_PE_Net

Input: $\mathcal{E}$, Context($\mathcal{E}$), $\mathcal{H}(\mathcal{P})$, $\mathcal{W}$, s, t, p, k
Output: $\Gamma^N$
Procedure Learn_PE_Net($\mathcal{E}$, Context($\mathcal{E}$), $\mathcal{H}(\mathcal{P})$, s, t, p, k)
1:    $\Gamma^N \leftarrow$ null
2:    $Y \leftarrow$ Generate_Cooccurences($\mathcal{H}(\mathcal{P})$, $\mathcal{W}$, $\mathcal{E}$, s, t, p)
3:    $\Omega \leftarrow$ Generate_Cases($Y$)
4:    for each $\Omega_i \in \Omega$
5:       $\mathcal{D} \leftarrow$ Extract_TrainingSet($\Omega_i$, Context($\mathcal{E}$))
6:       $\gamma^N \leftarrow$ RRHC(k, $\mathcal{D}$)
7:       Add $\gamma^N$ to $\Gamma^N$
8:    $\Gamma^N \leftarrow$ Adjust_Parameters($\Gamma^N$, $\mathcal{E}$)
9:    return $\Gamma^C$

---

Procedure RRHC(k, $\mathcal{D}$)
1:    $X \leftarrow$ Extract_Variables($\mathcal{D}$)
2:    $\gamma^N_{best} \leftarrow$ null
3:    for i = 1, ..., k
4:       $\gamma^N \leftarrow$ Generate_RandomStructure(X)
5:       while(not legal($\gamma^N$))
6:          $\gamma^N \leftarrow$ Generate_RandomStructure(X)
7:       $\gamma^N_{currentBest} \leftarrow$ null
8:       while($\gamma^N_{currentBest}$ = null)
9:          Neighbors($\gamma^N$) $\leftarrow$ GenerateLegalNeighbors( )
10:         nextStructure $\leftarrow$ null
11:         nextScore $\leftarrow$ -inf
12:         for each $\gamma^{N'} \in$ Neighbors($\gamma^N$)
13:            if ($P_{BIC}(\gamma^{N'}, \mathcal{D}) >$ nextScore)
            /* for $P_{BIC}$ refer to prior work */
14:               nextStructure $\leftarrow \gamma^{N'}$
15:               nextScore $\leftarrow \left(P_{BIC}(\gamma^{N'}, \mathcal{D})\right)$
16:            if $\left(\text{nextScore} \leq P_{BIC}(\gamma^N, \mathcal{D})\right)$
17:               $\gamma^N_{currentBest} \leftarrow \gamma^N$
18:            else
19:               $\gamma^N \leftarrow$ nextStructure
20:         if $\left(P_{BIC}(\gamma^N_{best}, \mathcal{D}) \leq P_{BIC}(\gamma^N_{currentBest}, \mathcal{D})\right)$
21:            $\gamma^N_{best} \leftarrow \gamma^N_{currentBest}$
22:         $\gamma^N_{best} \leftarrow$ BayesianParameterEstimation($\gamma^N_{best}$, $\mathcal{D}$)
         /* refer to prior work */
23:    return $\gamma^N_{best}$

(56) References Cited

OTHER PUBLICATIONS

Basrai, J., et al., "Best Practices for Using WebSphere Business Modeler and Monitor", Apr. 2006, 100 pages, website address, available online at http://www.redbooks.ibm.com/redpapers/pdfs/redp4159.pdf, as of Nov. 3, 2011.

Datta, A., "Automating the discovery of as-is business process models: Probabilistic and algorithmic approaches," Information Systems Research, Sep. 1998, pp. 275-301, vol. 9, No. 3, Institute for Operations Research and the Management Sciences, Hanover, Maryland, USA.

Folino, F., et al., "Discovering Multi-perspective Process Models: The Case of Loosely-Structured Processed", Lecture Notes in Business Information Processing, 2009, pp. 130-143, vol. 19, No. 3, Springer-Verlag Berlin Heidelberg.

Folino, F., et al., "Discovering Expressive Process Models from Noised Log Data", in Proceedings of the 2009 International Database Engineering & Applications Symposium, Sep. 16-18, 2009, pp. 162-172, Cetraro, Calabria, Italy, ACM, New York, New York, USA.

Buffett, S., et al., "Bayesian Classification of Events for Task Labeling Using Workflow Models", Lecture Notes in Business Information Processing, 2009, pp. 97-108, vol. 17, No. 2.

Ferreira, D., et al., "Discovering Process Models from Unlabelled Event Logs", 2009, Lecture Notes in Computer Science, pp. 143-158, vol. 5701, Springer-Verlag Berlin.

Weijters, A. J. M. M., et al., "Rediscovering workflow models from event-based data using little thumb", Integrated Computer-Aided Engineering, 2003, pp. 151-162, vol. 10, No. 2, IOS Press, Amsterdam, Netherlands.

Nodelman, U., et al., "Learning Continuous Time Bayesian Networks", in Proceedings of the 19th International Conference on Uncertainty in Artificial Intelligence, Aug. 7-10, 2003, pp. 451-458, Acapulco, Mexico.

Nodelman, U., et al, "Continuous Time Bayesian Networks", in Proceedings of the 18th International Conference on Uncertainty in Artificial Intelligence, Aug. 1-4, 2002, pp. 378-387, Alberta, Canada.

\* cited by examiner

Process 1: Learn_PE_Net

Input: $\mathcal{E}$, Context($\mathcal{E}$), $\mathcal{H}(\mathcal{P})$, $\mathcal{W}$, s, t, p, k
Output: $\Gamma^N$ Procedure Learn_PE_Net($\mathcal{E}$, Context($\mathcal{E}$), $\mathcal{H}(\mathcal{P})$, $\mathcal{W}$, s, t, p, k)
1:   $\Gamma^N \leftarrow$ null
2:   $\Upsilon \leftarrow$ Generate_Cooccurences($\mathcal{H}(\mathcal{P})$, $\mathcal{W}$, $\mathcal{E}$, s, t, p)
3:   $\Omega \leftarrow$ Generate_Cases($\Upsilon$)
4:   for each $\Omega_i \in \Omega$
5:     $\mathcal{D} \leftarrow$ Extract_TrainingSet($\Omega_i$, Context($\mathcal{E}$))
6:     $\gamma^N \leftarrow$ RRHC(k, $\mathcal{D}$)
7:     Add $\gamma^N$ to $\Gamma^N$
8:   $\Gamma^N \leftarrow$ Adjust_Parameters($\Gamma^N$, $\mathcal{E}$)
9:   return $\Gamma^C$

FIG. 1A

Procedure RRHC(k, D)
1: X ← Extract_Variables(D)
2: $y^N_{best}$ ← null
3: for i = 1, ..., k
4:   $y^N$ ← Generate_RandomStructure(X)
5:   while(not legal($y^N$))
6:     $y^N$ ← Generate_RandomStructure(X)
7:   $y^N_{currentBest}$ ← null
8:   while($y^N_{currentBest}$ == null)
9:     Neighbors($y^N$) ← GenerateLegalNeighbors( )
10:    nextStructure ← null
11:    nextScore ← −inf
12:    for each $y^{N'} \in$ Neighbors($y^N$)
13:      if ($P_{BIC}(y^{N'}, D) >$ nextScore)
         /* for $P_{BIC}$ refer to prior work */
14:        nextStructure ← $y^{N'}$
15:        nextScore ← ($P_{BIC}(y^{N'}, D)$)
16:    if(nextScore ≤ $P_{BIC}(y^N, D)$)
17:      $y^N_{currentBest}$ ← $y^N$
18:    else
19:      $y^N$ ← nextStructure
20:  if ($P_{BIC}(y^N_{best}, D) \leq P_{BIC}(y^N_{currentBest}, D)$)
21:    $y^N_{best}$ ← $y^N_{currentBest}$
22:  $y^N_{best}$ ← BayesianParameterEstimation($y^N_{best}, D$)
     /* refer to prior work */
23: return $y^N_{best}$

FIG. 1B

| ID | Date | Event Type | Source | Context | Source |
|---|---|---|---|---|---|
| 1 | 1/5/2009 | Radio Commercial | CRM System | | |
| 2 | 1/14/2009 | TV Commercial | CRM System | Ad_ID = 1 | CRM System |
| 3 | 1/15/2009 | Radio Commercial | CRM System | | |
| 4 | 1/15/2009 | Follow Up | eMail Notification | Weather = sunny | Weather API |
| 5 | 1/18/2009 | Purchase Order | CRM System | | |
| 6 | 1/20/2009 | Radio Commercial | CRM System | | |
| 7 | 2/5/2009 | Radio Commercial | CRM System | | |
| 8 | 2/6/2009 | Follow Up | eMail Notification | Weather = not sunny | Weather API |
| 9 | 2/07/2009 | TV Commercial | CRM System | Ad_ID = 2 | CRM System |
| 10 | 2/15/2009 | Radio Commercial | CRM System | | |
| 11 | 2/16/2009 | Information Request | CRM System | | |
| 12 | 2/20/2009 | Radio Commercial | CRM System | | |
| 13 | 2/20/2009 | Purchase Order | CRM System | | |
| ... | | | | | |

FIG. 4

| ID | Event Type | ID | Event Type |
|---|---|---|---|
| 2 | TV Commercial | 2 | TV Commercial |
| 9 | TV Commercial | 9 | TV Commercial |
| - | TV Commercial | - | TV Commercial |
| 24 | TV Commercial | 24 | TV Commercial |
| ... | ... | ... | ... |

| ID | Event Type | ID | Event Type |
|---|---|---|---|
| 4 | Follow Up | - | Information Request |
| 8 | Follow Up | 11 | Information Request |
| 16 | Follow Up | 18 | Information Request |
| - | Follow Up | 28 | Information Request |
| ... | ... | ... | ... |

| Case | ID | Event Type | ID | Event Type | ID | Event Type | ID | Event Type |
|---|---|---|---|---|---|---|---|---|
| 1 | 2 | TV Commercial | 4 | Follow Up | - | Information Request | | ... |
| 2 | 9 | TV Commercial | 8 | Follow Up | 11 | Information Request | | ... |
| 3 | - | TV Commercial | 16 | Follow Up | 18 | Information Request | | ... |
| 4 | 24 | TV Commercial | - | Follow Up | 28 | Information Request | | ... |
| ... | ... | ... | ... | ... | ... | ... | | ... |

FIG. 7

PROBABILISTIC EVENT NETWORKS BASED ON DISTRIBUTED TIME-STAMPED DATA

FIELD OF THE INVENTION

The subject matter presented herein generally relates to using probabilistic event networks to improve business key performance indicators (KPIs) based on distributed, time-stamped data.

BACKGROUND

Increasing digitization of enterprise internal operations as well as external environments implies an availability of information about a large amount of ordinary events that occur within and around an enterprise. For example, systems for enterprise resource planning (ERP), supply chain management (SCM), or customer relationship management (CRM) record many of the events related to the corresponding management areas. Also, RFID sensors provide information about events related to physical assets. Given a stream of primitive data about ordinary events, actionable information may be extracted to allow reasoning and decision-making in real-time.

BRIEF SUMMARY

One aspect provides a method for predicting events from event log data, comprising: constructing at least one probabilistic event network using training data, the training data being multivariate point process data, said constructing comprising: receiving the training data; determining co-occurrence assignments for pairs of event classes represented in the training data; generating at least one case set comprising correlated events for at least a portion of the pairs of event classes using the co-occurrence assignments; and constructing the at least one probabilistic event network from the at least one case set; receiving a query regarding at least one future event; and upon receiving the query, using the at least one probabilistic event network to infer a probabilistic statement regarding said at least one future event using a network inference mechanism.

Another aspect provides a computer program product for predicting events from event log data, comprising: a computer readable storage medium having computer readable program code embodied therewith, the computer readable program code comprising: computer readable program code configured to construct at least one probabilistic event network using training data, the training data being multivariate point process data, wherein to construct further comprises: receiving the training data; determining co-occurrence assignments for pairs of event classes represented in the training data; generating at least one case set comprising correlated events for at least a portion of the pairs of event classes using the co-occurrence assignments; and constructing the at least one probabilistic event network from the at least one case set; computer readable program code configured to receive a query regarding at least one future event; and computer readable program code configured to, upon receiving the query, use the at least one probabilistic event network to infer a probabilistic statement regarding said at least one future event using a network inference mechanism.

A further aspect provides a system for predicting events from event log data, comprising: at least one processor; and a memory device operatively connected to the at least one processor; wherein, responsive to execution of program instructions accessible to the at least one processor, the at least one processor is configured to: construct at least one probabilistic event network using training data, the training data being multivariate point process data, wherein to construct comprises: receiving the training data; determining co-occurrence assignments for pairs of event classes represented in the training data; generating at least one case set comprising correlated events for at least a portion of the pairs of event classes using the co-occurrence assignments; and constructing the at least one probabilistic event network from the at least one case set; receive a query regarding at least one future event; and upon receiving the query, use the at least one probabilistic event network to infer a probabilistic statement regarding said at least one future event using a network inference mechanism.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 1(A-B) illustrates an example approach for learning a probabilistic event network (PE net).

FIG. 4 illustrates an example of distributed, time-stamped event log data.

FIG. 7 illustrates example case sets.

DETAILED DESCRIPTION

Figure 2:
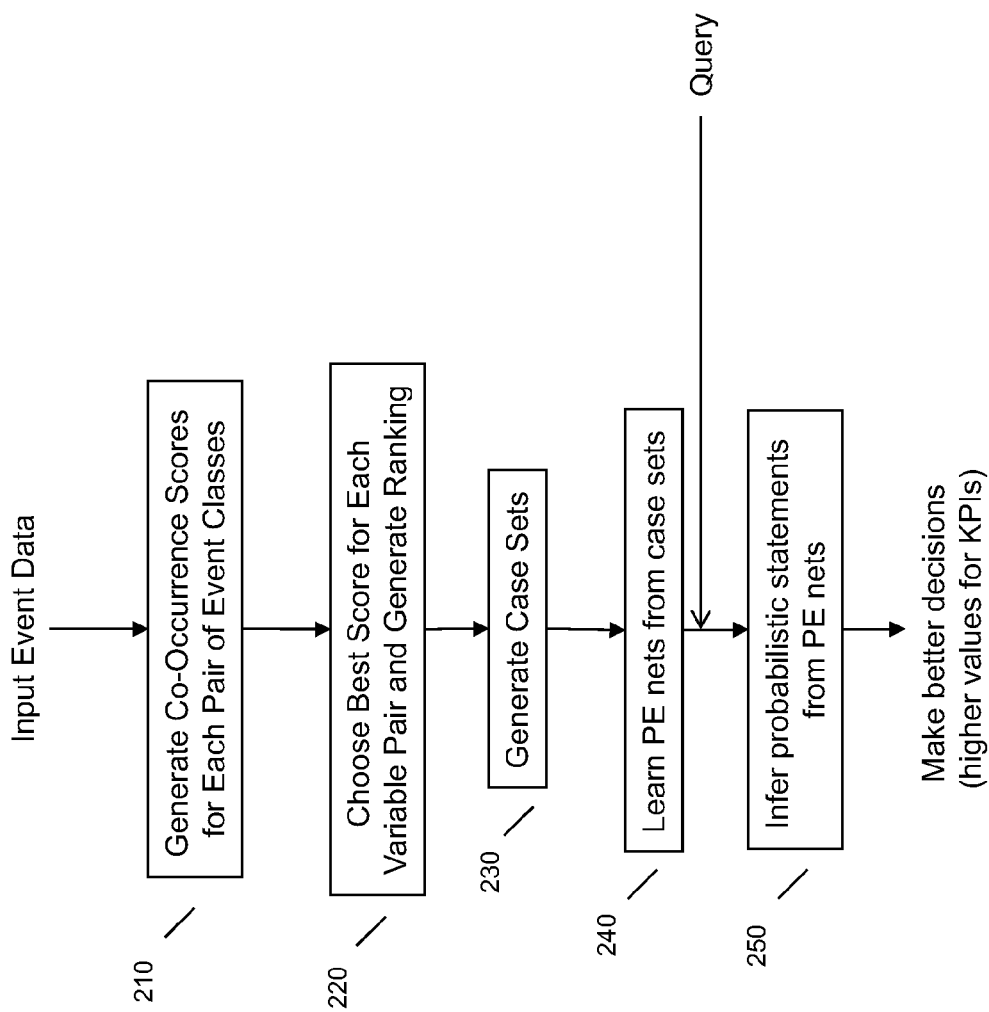
FIG. 2 illustrates an example method for making inferred probabilistic statements from PE nets.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Given that information is available about a large amount of ordinary events that occur within and around an enterprise, using this information to improve business key performance indicators (KPIs) is of interest. Within event-driven architectures (EDA) complex event processing (CEP) is the task of matching a confluence of ordinary events against predefined event patterns, called complex events. For example, using historical data, a sales manager of a paper company may want to predict if and when a customer will reorder paper in the following month. Thus, the event is a "purchase order", and the underlying KPI is "increase the number of purchase orders".

An embodiment provides a probabilistic representation of event patterns that may be leveraged to provide for such forecasting. For example, an embodiment utilizes Bayesian networks in order to represent event patterns as probabilistic event networks (PE nets). PE nets provide rich models consisting of stochastically caused relations between events, and relations between variables specifying the context of events. Some benefits of a probabilistic representation are the possibility of automatically learning event patterns from past event streams and the ability to use these patterns in order to formulate probabilistic queries. This will build the foundation of probabilistic EDAs allowing users to infer prognostic as well as diagnostic statements about non-deterministic environments.

In traditional event-based methodologies, events are typically represented as quintuple $\in = (id, a, c, t_b, t_e)$ with id as the unique identifier, $a = \{attr_1, attr_2, \ldots, attr_n\}$, as the attribute set, $c = \{\in_1, \in_2, \ldots, \in m\}$, as the event set that caused event $\in$, and $t_b, t_e$ as the starting and ending time, respectively. Event patterns are deterministic templates that match certain sets of events. Frequently, they describe not only events but also their causal dependencies and their context. In order to be able to apply probabilistic techniques, a representation based on probabilistic graphical models is chosen here. More specifically Bayesian nets (BN) are used, as structural and parametrical learning algorithms for BNs are quite advanced. Some definitions utilized are as follows.

Definition 1 (Events). An event $\in$ is a triple (id, date, γ) with Id($\in$)=id as the unique identifier, Date($\in$)=date specifying a unique location in time, and Class($\in$)=γ the event class.

Definition 2 (Event classes). Given a set of attribute variables $\mathcal{A}$ and its domain, Dom($\mathcal{A}$), an event class γ is an element of Dom($\mathcal{A}$).

An event class γ represents all events that share a certain set of features. Event classes are divided in atomic event classes denoted by $γ^A$ and event patterns, that is, probabilistic event networks, denoted by $γ^N$. A formal definition of $γ^N$ follows in Definition 6. First, some further concepts are introduced.

Definition 3 (Occurrences). Given a set of event classes, Γ, occurrence is a binary variable related to an event class γ∈Γ and denoted by $\Psi_γ$ with Dom($\Psi_γ$)={false, true}. If and only if there is a particle $ξ⟨\Psi_γ⟩$ =true, an event of class γ occurs and there is a bidirectional implication of the form $ξ⟨\Psi_γ⟩$ = true$⇔∃\in=(id, date, γ)$.

As used herein, $\psi_γ$ denotes the value of $\Psi_γ$ and $\psi_γ^1$ denotes true and $\psi_γ^0$ denotes false. $\Psi_Γ$ is used to denote a set of variables of $\psi_γ$ with each γ∈Γ. An element of Dom($\Psi_Γ$)=$\Pi_{γ∈Γ}$ Dom($\Psi_γ$) is denoted by $\psi_Γ$, and $\psi_Γ^0$ is used to denote $\Psi_γ$=false for each $\Psi_γ∈\Psi_Γ$. Based on the notion of occurrences, the event context is defined as follows.

Definition 4 (Event context): Given a variable $\Psi_{γi}$, a set of context variables $\Phi^i$ specifies facts about the state in which an event of class $γ_i$ occurs. It can be differentiated between the set of generic context variables $\Phi_{gen}^i \subseteq \Phi^i$, where the assignment $ξ⟨\Phi_{gen}^i⟩$ is unknown in case of $ξ⟨\Psi_{γi}⟩$ =$\psi_{γi}^0$, and the set of specific context variables $\Phi_{spec}^i = \Phi^i - \Phi_{gen}^i$, where $ξ⟨\Phi_{spec}^i⟩$ is not defined in case of $ξ⟨\Psi_{γi}⟩$ =$\psi_{γi}^0$ (i.e. $ξ⟨\Phi_j^i⟩$ =null for each $\Phi_j^i ∈ \Phi_{spec}^i$).

The domain of each $\Phi_j^i$ is denoted by dom($\Phi_j^i$)={$\phi^1, \phi^2, \ldots, \phi^k$}, and the domain of $\Phi^i$ is denoted by Dom($\Phi^i$)=$\Pi_{\Phi^j∈\Phi^i}$ Dom($\Phi_j^i$), representing the set of all possible assignments to the variables in $\Phi^i$. $\phi^i$ is used to represent an element of Dom($\Phi^i$). The set of all context variables of a set $\Psi_Γ$ is denoted by $\Phi^Γ$ and an element of Dom($\Phi^Γ$)=$\Pi\Phi_{i∈\Phi^Γ}$ dom($\Phi^i$) is denoted by $\phi^Γ$. Further, $\phi_{null}^i$ is used to denote $\Phi_j^i$=null for each $\Phi_j^i∈\Phi^i$. In order to represent relationships for occurrences and event context the following definition is used.

Definition 5 (relations). Let x be the union $\Psi_Γ \cup \Phi^Γ$, a relation is a tuple r=($X_i, X_j$), $X_i \neq X_j \wedge X_i, X_j \in X$ which represents a relationship in the way that the value of $x_j$ depends on the value of $x_i$.

R will be used for representing a set of relations. Intuitively, given a variable $\Psi_{γi}$ and a set of context variables $\Phi_{spec}^i$, for each $\Phi_j^i∈\Phi_{spec}^i$, there is a default relation $r^{default}=(\Psi_{γi}, \Phi_j^i)$ representing the fact that specific context variables always depend on the actual occurrence of an event. Based on above definitions, the notion of PE nets is defined as follows.

Definition 6 (Probabilistic Event Networks). Let x represent a union $\Psi_Γ \cup \Phi^Γ$ with Dom(x)=$\Pi$(Dom($\Psi_Γ$)×Dom($\Phi^Γ$)) and assume a set R over the variables in x. A probabilistic event network (PE net) $γ^N$ is a BN (G, Θ) where the directed acyclic graph G=(X, R) represents the structure of $γ^N$ and the parameters Θ specify the set of conditional probabilities in the form $θ_{x_i|pa_j}$=P(X=$x_i$|Pa(x)=$pa_j$(X)) where X∈X and (Pa(X),X)∈R for each Pa(X)∈Pa(X) and with:

$$\Sigma_{x_i \in Dom(x)} θ_{x_i|pa_j} = 1. \quad (1)$$

Based on Definition 6, an event class $γ_i∈Γ$ is part of PE net $γ^N$. In order to allow reasoning over time for PE nets, the following additional concepts are used.

Definition 7 (Trigger). Given $γ^N$=(G,Θ) with G=($\Psi_Γ \cup$,R) and given a particle $ξ⟨\Psi_{γ^N}⟩ = \Psi_γ^1 N ⇔ ∃\in_z=(id_z, date_z, γ^N)$, there is exactly one particle $ξ⟨\Psi_{γi}⟩ = \psi_{γi}^1 ⇔ ∃\in_x=(id_x, date_x, γ_i)$ such that $date_x < date_y$ for any $ξ⟨\Psi_{γj}⟩ = \psi_{γj}^1 ⇔ ∃\in_y = (id_y, date_y, γ_j)$ with $\Psi_{γi}, \Psi_{γj} ∈ \Psi_Γ$.

$\in_x$ is the trigger of $\in_z$, and denoted by $t(\in_z)$. $\Psi_{γi}$ is called a trigger variable of vyn and the set of all trigger variables within $\Psi_Γ$, given $γ^N$ is denoted by $\mathcal{T}(γ^N)$. Based on the definition for triggers in a PE net, now a variable is defined that represents the time context of an event occurrence and thereby enables reasoning procedures over time.

Definition 8 (Time Context). Given $ξ⟨\Psi_{γ^N}⟩ = \psi_{γ^N}^1 ⇔ ∃\in_z$ with $γ^N$=(G,Θ) and G=($\Psi_Γ \cup \Phi^Γ$,R) and given $t(\in_z)=\in_x=(id_x, date_x, γ_i) ⇔ ξ⟨\Psi_{γi}⟩ = \psi_{γi}^1$ for each variable $\Psi_{γk} ∈ \Psi_Γ$ the time context is a relation $r_{time} = (\Psi_{γk}, \Phi_{time}^k)$ with $\Phi_{time}^k ∈ \Phi_{spec}^k$ such that $ξ⟨\Phi_{time}^k⟩$ =null in case of $ξ⟨\Psi_{γk}⟩ = \psi_{γk}^0$ and $ξ⟨\Phi_{time}^k⟩ = date_y - date_x$ in case $ξ⟨\Psi_{γk}⟩ = \psi_{γk}^1 ⇔ ∃\in_y = (id_y, date_y, γ_k)$.

For each variable $\Phi_{time}^k$ there is a constant max($\Phi_{time}^k$) denoting the maximum value of $\Phi_{time}^k$. $\Phi_{time}^Γ$ is used to denote all time variables in G.

Definition 9 (Range). Given $\gamma^N=(G,\Theta)$ with $G=(\Psi_\Gamma \cup \Phi^\Gamma, R)$ the range of $\gamma^N$ is $(\gamma^N)=\max\{\Pi_i \max(\Phi_{time}{}^i)\}, \forall \Phi_{time}{}^i \in \Phi^i, \forall \Psi_{\gamma i} \in \Psi_\Gamma$.

Although the time context represents a continuous variable, in the following a discretization of this variable is assumed, resulting in an ordinal variable with a set of time ranges as values. Based on the above assumptions, for large numbers of time slices an explicit representation of events through PE nets is more efficient than a DBN based representation, as can be shown by proving the following theorem.

Theorem 1. Given a set of random variables $\chi=\Psi_\Gamma \cup \Phi^\Gamma$, for large numbers of time slices the number of parameters necessary for representing a joint distribution over $\chi$ with DBNs is exponentially larger than the number of parameters necessary for representing the same distribution with PE nets.

Proof. A DBN is represented by a pair $\langle \mathcal{B}_0, \mathcal{B}_\rightarrow \rangle$, where $\mathcal{B}_0$ is a BN over $\chi^{(t_0)}$, with $\chi^{(t_n)}$ representing the state of a set of random variables $\chi$ at time $t_n$, and $\mathcal{B}_\rightarrow$ is a set of BNs, where each $\mathcal{B}_\rightarrow^{(t_n)} \in \mathcal{B}_\rightarrow$ is a conditional BN over $\chi^{(t_n)}$ given $X_I$, with $X_I \subseteq \Pi_{i=t_0}^{t_{n-1}} \chi^{(i)}$ for all $t_n > 0$. Non-temporal relations (intra-time-slice edges) in a DBN are defined through $\mathcal{B}_0$ and temporal relations between variables (inter-time-slice edges) are represented with $\mathcal{B}_\rightarrow$. In a PE net based representation non-temporal relations are all relations where no time context is involved: Given $\gamma^N=(G,\Theta)$ with $G=(\Psi_\Gamma \cup \Phi^\Gamma, R)$, non-temporal relations are all $r=(X_i, X_j) \in R$ with $X_i \wedge X_j \notin \Phi_{time}{}^\Gamma$. The representation of non-temporal relations is the same as for DBNs. The difference to DBNs is that PE nets use a time context for each occurrence of an event instead of the transition model $\mathcal{B}_\rightarrow$. Therefore, one can reduce the comparison to DBNs to all relations involving a time context. Consider $r=(X_i, X_j) \in R$ with $X_j=\Phi_{time}{}^k$ and $r_{time}=(\Psi_{\gamma k}, \Phi_{time}{}^k) \notin R \wedge \Psi_{\gamma k} \in \Psi_\Gamma$: Given $Dom(X_j)=\{null, t_0, \ldots, t_n\}$, the number of parameters for specifying the conditional distribution $p(X_j|X_i)$ with PE nets is $|Dom(X_j)|*(n+1)$. The relation $r$ represents the fact that the distribution over the time context of $\Psi_{\gamma k}$ (that is, the distribution over the date of the occurrence of events of class $\gamma_k$) depends on the value of variable $X_i$. Using DBNs, this dependency would be encoded in a conditional distribution over the variable $\Psi_{\gamma k}^{(t_q)}$ given $X_i^{(t_q)}$ and $\Psi_{\gamma k}^{(t_{q-1})}$ for each $t_q > 0$. The number of parameters needed is thus $4*\Sigma_{q=1}^n(|Dom(X_i)|)$ and not exponential in the size of the time slices. Let's now consider $r=(X_i, X_j) \in R$ with $X_i=\Phi_{time}{}^k$ and $r_{time}=(\Psi_{\gamma k}, \Phi_{time}{}^k) \in R \wedge \Psi_{\gamma k} \in \Psi_\Gamma$: Given $Dom(X_i)=\{null, t_0, \ldots, t_n\}$, the number of parameters for specifying the conditional distribution $P(X_j|X_i)$ with PE nets is again $|Dom(X_j)|*(n+1)$. In this case the relation $r$ represents the fact that the distribution over variable $X_j$ depends on the time context of $\Psi_{\gamma k}$. Using DBNs the variable $\Psi_{\gamma k}$ would be considered in each time slice $t_0, \ldots, t_n$ denoted by $\Psi_{\gamma k}^{(t_0)}, \ldots, \Psi_{\gamma k}^{(t_n)}$. The dependency of $X_j$ from $\Phi_{time}{}^k$ would therefore be encoded in the transition model and specified with the conditional distributions $P(X_j^{(t_q)}|\Psi_{\gamma k}^{(t_{q-1})}, \ldots, \Psi_{\gamma k}^{(t_0)})$ for each $q > 0$. Hence, the number of parameters for each conditional distribution is $\Sigma_{q=1}^n(|Dom(X_j)|*2^{(q-1)})$ and therefore exponential in the size of time slices.

Traditional event-based methodologies assume complete information and deterministic environments. This leads to the following inference tasks, typically used with traditional approaches. First, logical statements can be made regarding which events will follow based on given observations. Second, a given stream of events can be checked if there is an occurrence of an event pattern described in terms of a logical formula. The output of these tasks is either sequences of events or true/false statements.

In BN theory inference refers to computing the posterior probability $P(X|Y=y)$ of a set of $x$ query variables after obtaining some observations $=y$. Many exact and approximate algorithms for BN inference have been suggested. Inference in PE nets is a special case of BN inference and thus all the algorithms for BNs also apply to PE nets.

Imagine an environment with an agent able to infer over PE nets using some of the inference algorithms referenced above. Differentiation can be made between prognostic (ex ante) and diagnostic (ex post) reasoning.

Definition 10 (Prognostic Reasoning). Given $\gamma^N=(G,\Theta)$ with $G=(X=\Psi_\Gamma \cup \Phi^\Gamma, R)$, and assuming complete information, prognostic reasoning within PE nets comprises the following inference tasks: 1) If $\xi \langle \Psi_{\gamma i} \rangle = \psi_{\gamma i}{}^0$ for all $\Psi_{\gamma i} \in \mathcal{T}(\gamma^N)$, $\gamma^N$ is inactive with no observations related to $\gamma^N$ and the posterior probability $P(X')$ with $X' \subseteq X$ can be computed. 2) If $\xi \langle \Psi_{\gamma i} \rangle = \psi_{\gamma i}{}^1 \Leftrightarrow \exists \in_x = (id_x, date_x, \gamma_i)$ with $\Psi_{\gamma i} \in \mathcal{T}(\gamma^N)$, and if $date_{current} \leq date_x + Range(\gamma^N)$, $\gamma^N$ is active with observations $Y=y$ and the posterior probability $P(X'|Y=y)$ with $X' \subseteq X$ can be computed.

Intuitively, the first task allows reasoning over a PE net without having observed an occurrence of any of its triggers. Thus, inferred statements include probabilities of the occurrence of any of the triggers. Given that a trigger has occurred, that is, the PE net is active, the second task includes any query about elements of the PE net that did not yet occur. Note that as time progresses, probabilities of the time context of an event occurrence change and therefore parameters of the time context need to be adjusted.

Theorem 2. Given $\gamma^N=(G,\Theta)$ with $G=(X=\Psi_\Gamma \cup \Phi^\Gamma, R)$ is active, that is, $\xi \langle \Psi_{\gamma i} \rangle = \psi_{\gamma i}{}^1 \Leftrightarrow \exists \in_x = (id_x, date_x, \gamma_i)$ with $\Psi_{\gamma i} \in \mathcal{T}(\gamma^N)$, and given $\xi \langle \Psi_{\gamma j} \rangle = \psi_{\gamma j}{}^0$ with $\Psi_{\gamma j} \in \Psi_\Gamma$, if $date_{current} < date_x + \max(\Phi_{time}{}^j)$, the following parameters need to be adjusted:

1.

$$\text{if } a \wedge b \leq date_{current}: \theta'_{a \leq \Phi_{time}^j \leq b} = 0 \qquad (2)$$

2.

$$\text{if } a \wedge b > date_{current}: \theta'_{a \leq \Phi_{time}^j \leq b|\psi_{\gamma j}^1} = \qquad (3)$$

$$\theta_{a \leq \Phi_{time}^j \leq b|\psi_{\gamma j}^1} + \frac{\theta_{a \leq \Phi_{time}^j \leq b|\psi_{\gamma j}^1}}{\theta_{a \leq \Phi_{time}^j \leq \max(\Phi_{time}^j)|\psi_{\gamma j}^1}} * \theta_{date_x \leq \Phi_{time}^j \leq date_{current}|\psi_{\gamma j}^1}$$

3.

$$\text{if } a \leq date_{current} \wedge b > date_{current}: \theta'_{a \leq \Phi_{time}^j \leq b|\psi_{\gamma j}^1} = \qquad (4)$$

$$\theta'_{date_{current} < \Phi_{time}^j \leq b|\psi_{\gamma j}^1}$$

Proof. Since at time $date_{current} \xi \langle \Psi_{\gamma j} \rangle = \psi_{\gamma j}{}^0$ is given, according to Definition 8, $\xi \langle \Phi_{time}{}^j \rangle = null$ and thus at any time before or at $date_{current}$ (2) follows. Thus, adjusted parameters $$\theta'_{a \leq \Phi_{time}^j \leq b|\psi_{\gamma j}^1} = 0$$

for any $a \wedge b \leq date_{current}$. Due to (1), the parameters $$\theta_{a \leq \Phi_{time}^j \leq b|\psi_{\gamma j}^1}$$

need to be adjusted for any $a \wedge b > \text{date}_{current}$ according to (3). (4) follows by summing $$\theta'_{a \leq \Phi^j_{time} \leq date_{current} | \psi^1_{\gamma_j}} = 0 \text{ and } \theta'_{date_{current} \leq \Phi^j_{time} \leq b | \psi^1_{\gamma_j}}.$$

Whereas prognostic reasoning assumes complete information and comprises queries about future event occurrences and their context, diagnostic reasoning assumes incomplete information and includes all queries about missing information on past event occurrences and their context.

Definition 11 (Diagnostic Reasoning). Given $\gamma_N = (G, \Theta)$ with $G = (X = \Psi_\Gamma \cup \Phi^\Gamma, R)$, and assuming incomplete information with information about $X' \subset X$ missing, diagnostic reasoning within PE nets comprises the following inference task: If $\xi \langle \Psi_{\gamma i} \rangle = \psi_{\gamma i}^1 \Leftrightarrow \exists \in_x = (\text{id}_x, \text{date}_x, \gamma_i)$ with $\Psi_{\gamma i} \in \mathcal{T}(\gamma^N)$, and if $\text{date}_{current} > \text{date}_x + \text{Range}(\gamma^N)$, $\xi \langle \Psi_{\gamma^N} \rangle = \psi_{\gamma^N}^1$ and the posterior probability $P(X'|Y=y)$ with $\gamma = X - X'$ can be computed.

A major advantage of using PE nets for representing event patterns is the possibility to include uncertainty and formulate rich probabilistic queries that allow prognostic and diagnostic reasoning as defined above. Both kinds of probabilistic reasoning are not possible with traditional event-based approaches.

Learning Probabilistic Event Networks

Representations based on PE nets allow not only reasoning about predefined event patterns as in traditional event-based approaches, but also learning typical event patterns from distributed and noisy event data. In event-based environments one is typically confronted with data streams representing sets of events generated by distributed sources. Let's consider a representative timeframe and assume a recorded dataset representing a set of events $\in$, ordered according to time. Thus, for any pair $\in_i = (\text{id}_i, \text{date}_i, \gamma_k)$ and $\in_j = (\text{id}_j, \text{date}_j, \gamma_l)$ with $i<j$, $\text{date}_i < \text{date}_j$. Further, consider a set $\Gamma^A$ and assume a function that assigns to each $\in \in \in$ at least one $\gamma \in \Gamma^A$ and thus $\text{Classes}(\in) \subseteq \Gamma^A$. Assignments are usually performed through matching of attribute configurations assigned to an event and attributes assigned to $\gamma$. For assigning an event to $\gamma$ the attribute configuration of the latter needs to be a subset of the former's attribute configuration. Optionally available taxonomies can be considered in the matching process. This may result in events assigned to more than one class, whereas the corresponding classes are hierarchically related to each other. In the following specifics to be considered while using taxonomies are not addressed and it is assumed that for each see there is exactly one assignment $(\in, \gamma)$ with $\gamma \in \Gamma^A$. It is further assumed that for each $\in = (\text{id}, \text{date}, \gamma_i) \Leftrightarrow \xi \langle \Psi_{\gamma i} \rangle = \Psi_{\gamma i}^1$ the recording of the context $\xi \langle \Phi^i \rangle = \phi^i$ with $\phi^i \in \text{Dom}(\Phi^i)$. Let's denote the context of all events in $\in$ with $\text{Context}(\in)$. Now, the task is to learn $\Gamma^N$ from a set $\mathcal{Q}(\in, \text{Context}(\in))$ of $|\in|$ tuples $(\in, \xi \langle \Phi^i \rangle)$.

BN learning in general assumes training sets representing samples of the network to be learned. These training sets may be noisy and incomplete. However in the problem formulated above it is unknown how many networks are responsible for generating e and it is not known which atomic event classes belong to which PE net.

Thus, the set $\mathcal{Q}(\in)$ needs to be preprocessed using heuristics in order to identify time-based correlations between event classes constituting $\Gamma^N$. Thereby only $\text{date}_i$ and $\gamma_j$ need to be considered for each record in $\mathcal{Q}(\in)$. Several research fields addressed the problem of identifying correlations across time-based sequences.

Learning Co-Occurrences

In general correlations between events are determined by identifying ordered collections of events frequently co-occurring within a certain time range. Thereby approaches differ based on the order of events, that is, directed versus undirected approaches, based on the minimum frequency of occurrence and based on the time range chosen. Some approaches consider interval rules across time series allowing for example detection of correlations between clusters of events.

Different approaches lead to different correlation results. Here an example combinatorial approach is taken, leading to several alternative correlation results in a first step, all of which are evaluated, and one being selected, in a subsequent step. In order to be able to combine several approaches, only pairwise co-occurrences are considered, whereas many approaches from frequent episode mining continue to further analyze co-occurrences of pairs of events. Here, the latter will be substituted with a Bayesian approach for generating more complex event relations.

Lemma 1. There is a set of heuristics $\mathcal{H}$ where each heuristic $h_x \in \mathcal{H}$ takes the set $\in$ as input and generates for each pair $(\gamma_i, \gamma_j)$ with $\gamma_i, \gamma_j \in \Gamma^A$, a set of co-occurrences $\gamma_{h_x}^{\gamma_i, \gamma_j}$ where each $\upsilon_\gamma^{\gamma_i, \gamma_j} \in \gamma_{h_x}^{\gamma_i, \gamma_j}$ is a tuple $(\in', \in'')$ with $\in' = (\text{id}_{\in'}, \text{date}_{\in'}, \gamma_i)$ and $\in'' = (\text{id}_{\in''}, \text{date}_{\in''}, \gamma_j)$. Further, for any two tuples $\upsilon_p^{\gamma_i, \gamma_j} = (\in', \in'')$ and $\upsilon_q^{\gamma_i, \gamma_j} = (\in''', \in'''')$, the following holds: $\in' \neq \in'''$ and $\in'' \neq \in''''$.

Definition 12 (Co-occurrence Scores). Given a pair of events $(\gamma_i, \gamma_j)$ and a set $\gamma_{h_x}^{\gamma_i, \gamma_j}$, there are three co-occurrence scores:

1. $\text{score}_{h_x}(\gamma_i \Rightarrow \gamma_j) = |\gamma_{h_x}^{\gamma_i, \gamma_j}| / |\in_k \in \in | \in_k = (\text{id}_k, \text{date}_k, \gamma_i)|$ (5)

2. $\text{score}_{h_x}(\gamma_j \Rightarrow \gamma_i) = |\gamma_{h_x}^{\gamma_i, \gamma_j}| / |\in_k \in \in | \in_k = (\text{id}_k, \text{date}_k, \gamma_j)|$ (6)

3. $\text{score}_{h_x}(\gamma_i \Leftrightarrow \gamma_j) = \min(\{\text{score}_{h_x}(\gamma_i \Rightarrow \gamma_j), \text{score}_{h_x}(\gamma_j \Rightarrow \gamma_i)\})$ (7)

The first two scores are called unilateral scores and the last a bilateral score. It is assumed that bilateral scores indicate a stronger correlation than unilateral scores. Now, let $\mathcal{P}^{h_x}$ denote a set of parameters for heuristic $h_x$ and let $w^{h_x}$ be a constant factor representing a weight for heuristic $h_x$. Let $\mathcal{P}$ denote the set $\{\mathcal{P}^{h_1}, \mathcal{P}^{h_2}, \ldots, \mathcal{P}^{h_{|\mathcal{H}|}}\}$ and $\mathcal{W}$ the set $\{w^{h_1}, w^{h_2}, \ldots, w^{h_{|\mathcal{H}|}}\}$. Further, given a pair of event classes $(\gamma_i, \gamma_j)$, a set $\gamma_{h_x}^{\gamma_i, \gamma_j}$ and a co-occurrence score $\text{score}_{h_x}(\gamma_i, \gamma_j)$, let constant s denote the minimum threshold for $|\gamma_{h_x}^{\gamma_i, \gamma_j}|$ and let the constant t be a minimal threshold for a score $\text{score}_{h_x}(\gamma_i, \gamma_j)$ such that the pair $(\gamma_i, \gamma_j)$ is being considered. Let constant p be a penalty for unilateral scores. Now, a procedure can be defined that takes the sets $\mathcal{H}(\mathcal{P}) = \{h_1(\mathcal{P}^{h_1}), \ldots, h_{|\mathcal{H}|}(\mathcal{P}^{h_{|\mathcal{H}|}})\}$, $\mathcal{W}$ and $\in$, and the three predefined constants s, t and p as input and generates an ordered list of co-occurrence sets Y, whereas ordering is based on the weighted score.

Probabilistic Event Networks Learning

Given $\gamma$, a simple procedure is defined for generating sets of cases $\Omega = \{\Omega_1, \Omega_2, \ldots, \Omega_{|\Omega|}\}$ where each set will serve as the basis for learning details of $\gamma^N$. This procedure assumes that no $\gamma^A$ can be associated with more than one $\gamma^N$:

Assumption 1. Given a set $\Gamma^N$, if $\forall \gamma_i^N = ((X^i, R^i), \Theta^i) \in \Gamma^N, \forall \gamma_j^N = ((X^j, R^j), \Theta^j) \in \Gamma^N : \exists \gamma_k \wedge \Psi_{\gamma_k} \in X^i \wedge \Psi_{\gamma_k} \in X^j \Rightarrow \gamma_i^N = \gamma_j^N$.

each $\Omega_i \in \Omega$ contains a set of cases $\{\omega_1, \omega_2, \ldots, \omega_{|\Omega_i|}\}$ where each $\omega_j$ contains a set of events $\in^{\omega_j} = \{\in_1^{\omega_j}, \in_2^{\omega_j}, \ldots, \in_{68}^{\omega_j}\}$ with each $\in_k^{\omega_j} \in \in$. Let's denote the union of all event classes entailed in $\Omega_i$ by $\Gamma^{\Omega_i} = \bigcup_{j=1}^{|\Omega_i|} \bigcup_{k=1}^{|\in^{\omega_j}|} \text{Class}(\in_k^{\omega_j})$ and the union of all events entailed in $\Omega_i$ by $\in^{\Omega_i} = \bigcup_{j=1}^{|\Omega_i|} \bigcup_{k=1}^{|\in^{\omega_j}|} \in_k^{\omega_j}$. Further assume that in case of a non-occurrence of an event of a certain class, there is a random assignment to all its generic context variables according to their prior probability distribution.

Assumption 2. Given $\xi\langle \Psi_{\gamma_i}\rangle = \psi_{\gamma_i}^0$, the assignment for $\xi\langle \Phi_{gen}^i\rangle = \phi_{gen}^i$ is randomly generated from a given distribution $P(\Phi_{gen}^i)$.

Now a theorem can be formulated stating that for each case there is an assignment over all variables $\psi_{\Gamma}^{\Omega_i}, \phi^{\Gamma^{\Omega_i}}, \phi_{time}^{\Gamma^{\Omega_i}}$:

Theorem 3. Given n, generated by procedure Generate_Cases($\gamma$), for all $\Omega_i \in \Omega \wedge \forall \omega_j \in \Omega_i : \exists \xi[j]\langle X\rangle = x_j$ with $x_j \in \Pi Dom(\Psi_{\Gamma}^{\Omega_i}) \times Dom(\Phi^{\Gamma^{\Omega_i}}) \times Dom(\Phi_{time}^{\Gamma^{\Omega_i}})$.

Proof. According to Definition 3, for all $\omega_j : \omega_j \Rightarrow \xi\langle \Psi_{\Gamma}^{\Omega_i}\rangle = \psi_{\Gamma}^{\Omega_i}$ with $\psi_{\Gamma}^{\Omega_i} \in Dom(\Psi_{\Gamma}^{\Omega_i})$ where $\xi\langle \Psi_\gamma\rangle = \psi_\gamma^0$ if $\exists \in = (id, date, \gamma) \in \omega_j$ and $\xi\langle \Psi_\gamma\rangle = \psi_\gamma^1$ if $\exists \in = (id, date, \gamma) \in \omega_j$. In addition, due to the initial set $Q(\in)$ there is for each $\omega_j$ and for each configuration $\xi\langle \Phi^\gamma\rangle = \phi^\gamma$ if $\exists \in = (id, date, \gamma) \in \omega_j$. In case $\exists \in = (id, date, \gamma) \in \omega_j$ due to Definition 4 there is an assignment $\xi\langle \Phi_{spec}^\gamma\rangle = null$ and due to Assumption 2 there is an assignment $\xi\langle \Phi_{gen}^\gamma\rangle = \phi_{gen}^\gamma$. Further, since each $\omega_j \in \Omega_i$ represents an occurrence $\xi\langle \Psi_\gamma^N\rangle = \psi_\gamma^1 \Leftrightarrow \in_z$, according to Definition 7 there is for each $\omega_j \in \Omega_i$ an event $\in^t (\in_z)$. Thus, according to Definition 8 there is for each $\Psi_\Gamma^{\Omega_i} \in \Psi_\Gamma^{\Omega_i}$ a relation $r_{time} = (\Psi_\gamma, \Phi_{time}^\gamma)$ and for each $\omega_j \in \Omega_i$ there is a assignment $\xi\langle \Phi_{time}^\gamma\rangle$ with $\xi\langle \Phi_{time}^\gamma\rangle = null$ in case $\xi\langle \Psi_\gamma\rangle = \psi_\gamma^0$ or $\in \langle \Phi_{time}^\gamma\rangle = Date(\in_k^{\omega_j}) - Date(\in')$ in case of $\xi\langle \Psi_\gamma\rangle = \psi_\gamma^1 \Leftrightarrow \in_k^{\omega_j}$.

Now, the problem of learning $\gamma^N$ to a set of $|\Omega|$ BN learning problems: For each $\Omega_i \in \Omega$, let $X = \Psi_\Gamma^{\Omega_i} \cup \Phi^{\Gamma^{\Omega_i}} \cup \Phi_{time}^{\Gamma^{\Omega_i}}$ be the variables of a BN and let the set $\mathcal{D}_i = \{\xi[1], \ldots, \xi[|\Omega_i|]\}$ be a set of particles where each $\xi[j]\langle X\rangle = x_j$ with $\xi[j]\langle X\rangle$ or short x[j] denoting the assignment to x in the particle $\xi[j]$. Now, let $\mathcal{D}_i$ be the training set for the learning. Here, a random restart hill-climbing approach is used for searching the space of possible net structures and the Bayesian Information Criterion is used for evaluation of the structures. Other search procedures and scoring metrics have been suggested and can be used alternatively. Further, due to Definition 5, in addition to the acyclicality property of BNs the space of legal net structures is limited to the graphs that contain the set $R^{default}$. For estimating the parameters of the selected structure the maximum likelihood estimation (MLE) approach for Bayesian networks is used.

FIG. 1(A-B) illustrates an example approach for learning $\Gamma^N$. Note that each $\gamma_i^N = (G, \Theta) \in \Gamma^N$ has been learned on the basis of a heuristically generated dataset $\mathcal{D}_i$ neglecting all other events in $\in$ and thereby assuming wrong priors for $\gamma_i^N$. Procedure Adjust_Parameters($\Gamma^N, \in$) performs a corresponding adjustment based on some known distribution (for example, a Poisson-based distribution) of the random occurrence of any of the triggers of a PE net.

Accordingly, an embodiment provides a novel way for representing events, called PE net, based on BN theory. PE nets define relations between event occurrences, relations between context variables, and relations between event occurrences and context variables. In contrast to DBNs, time is understood here as a context variable, and therefore relations between variables across several time slices can be represented in a much more compact way.

The same algorithms used for BN inference can be used for inference in PE nets, allowing reasoning with uncertainty, which is a novel way of reasoning in the context of traditional event-based frameworks, such as CEP or process management. In addition, representation through PE nets enables automatic discovery of event patterns from unlabeled and distributed event logs. A corresponding learning process combining heuristics from frequent episode mining and learning techniques from BN theory has also been described.

Thus, referring to FIG. 2, an embodiment will generate co-occurrence scores for each pair of event classes 210 given an input training set. The training set includes for example a representative history of event log data. Then, an embodiment will choose the best score for each variable pair and generate a ranking 220. Case sets will then be generated 230, and PE nets will be learned from the case sets 240. Given a new input of event log data (validation set), and a query, an embodiment may infer probabilistic statements from the PE nets 250 in order to make better decisions, such as determining when to follow up with customers in order to increase purchase orders.

As a concrete, non-limiting example, consider again the sales manager of a paper company that wants to predict if and when a customer will reorder paper in the following month. The future event of interest is a "purchase order", and the underlying KPI is "increase the number of purchase orders". Consider the following activities that may be gathered into a representative history of event log data. The paper company occasionally advertises on television (TV) (Event: "TV Commercial"). The paper company occasionally advertises on radio (Event: "Radio Commercial"). The sales staff occasionally follows up with the customer (Event: "Follow Up"). The customer occasionally requests further information (Event: "Information Request").

Figure 3:
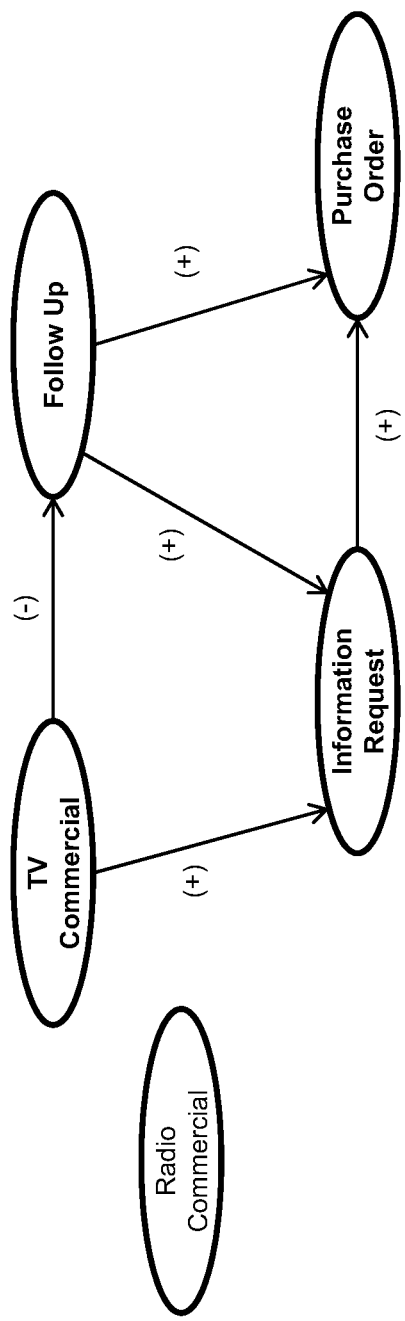
FIG. 3 illustrates example events and dependencies.

As illustrated in FIG. 3, in this example, assume it can be ascertained from the event log data that TV commercials have a positive influence on information requests. Also, follow-ups have a positive influence on information requests. Whenever there was a TV commercial, consider that the sales staff tends to lower the priority of following up and thus, there is a negative dependency between TV commercials and follow-ups. There is a positive dependency between follow-ups and purchase orders. An information request is a positive indicator that purchase orders follow. The radio commercials do not have any influence. Thus, in this example scenario, each of the events has the influence(s) illustrated in FIG. 3.

Each of these facts (but not necessarily their influences) may be available to an enterprise. For example, FIG. 4 illustrates an example of distributed, time-stamped point process data (including potentially relevant context variables) in an event log that might be available to an embodiment. Such data is accessed by an embodiment to provide PE nets.

Figure 5:
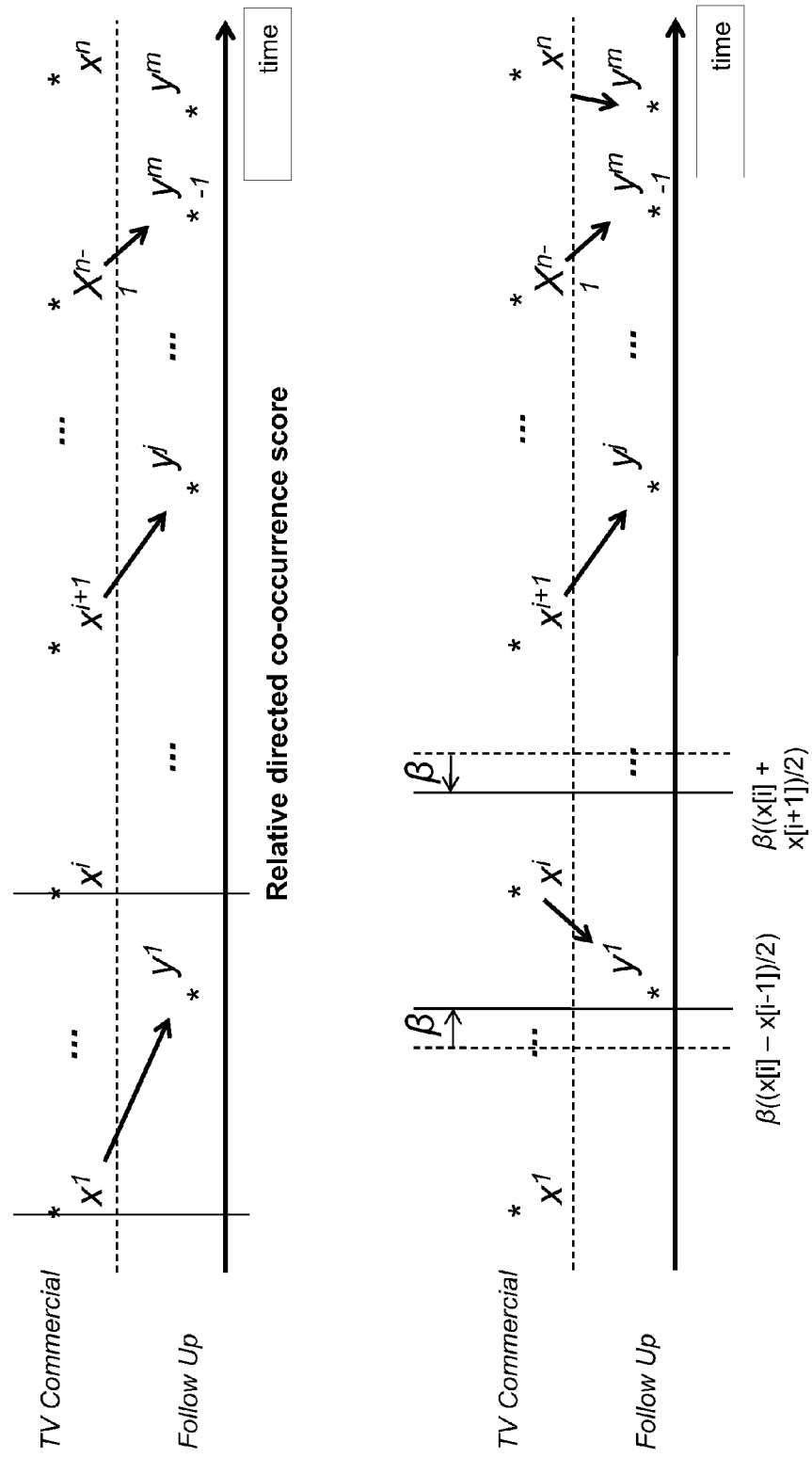
FIG. 5 illustrates examples of co-occurrence score generation for a pair of events.

As illustrated in FIG. 5, an embodiment generates co-occurrence scores for each pair of event classes in the event log data. Illustrated in FIG. 5 are examples of directed and undirected co-occurrence scores for events "TV Commercial" and "Follow Up" of the event log data. The co-occurrence scores used can vary and those in FIG. 5 are illustrative only. For example, according to the event log data, relative directed co-occurrence scores may be as follows:

Unilateral Score (TV Commercial→Follow Up)=3 Co-occurrences/5 TV Commercials=0.6.

Unilateral Score (Follow Up→TV Commercial)=3 Co-occurrences/4 Follow-Ups=0.75.

Bilateral Score (TV Commercial/Follow Up)=min (0.6, 0.75)=0.6.

For relative undirected co-occurrence scores:

Unilateral Score (TV Commercial→Follow Up)=4 Co-occurrences/5 TV Commercials=0.8.

Unilateral Score (Follow Up→TV Commercial)=4 Co-occurrences/4 Follow Ups=1.0.

Bilateral Score (TV Commercial/Follow Up)=min(0.8, 1.0)=0.8.

Figure 6:
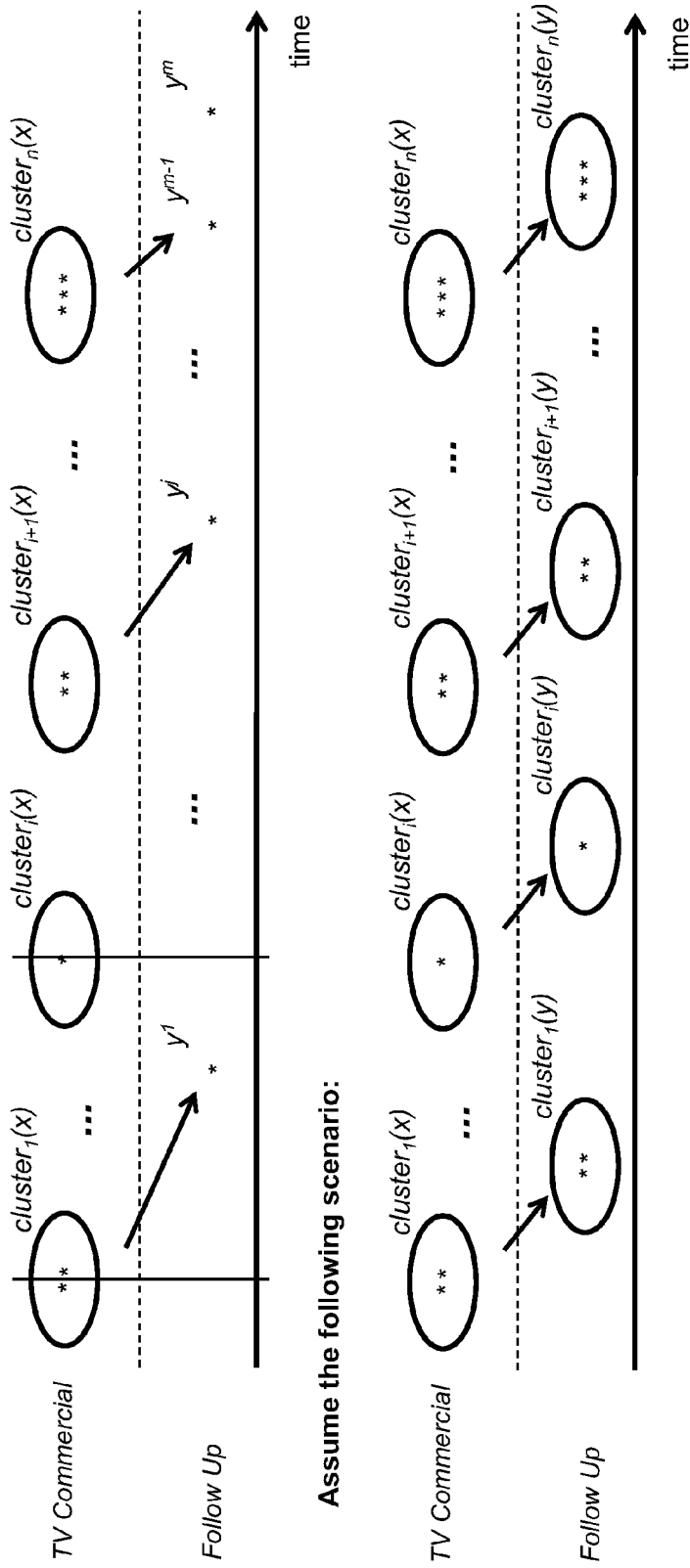
FIG. 6 illustrates an example of cluster based generation of co-occurrence scores for pairs of event classes

An embodiment may also utilize relative directed co-occurrence scores with EM based clustering, as illustrated in FIG. 6. For example, relative directed co-occurrence scores with EM based clustering may be as follows:

Unilateral Score (TV Commercial Follow Up)=3 Co-occurrences/4 TV Commercial Cluster=0.75.

Unilateral Score (Follow Up→TV Commercial)=3 Co-occurrences/4 Follow Ups=0.75.

Bilateral Score (TV Commercial/Follow Up)=min(0.75, 0.75)=0.75

An embodiment may perform regression analysis in order to detect linear relation(s) that indicate overlapping classes and can thus be treated as separate classes. An embodiment next chooses the best score for each variable pair and generates a ranking.

In a next step, illustrated in FIG. 7, an embodiment generates case sets. For each variable pair (TV Commercial; Follow Up and TV Commercial; Information Request) there is a set of co-occurrences (generated by the corresponding heuristic). An embodiment builds cases starting with the pairs with the highest co-occurrence score. In the case of conflicts, the assignments generated with higher co-occurrence scores may be considered valid. Then, time and context are added to the case sets.

Figure 8:
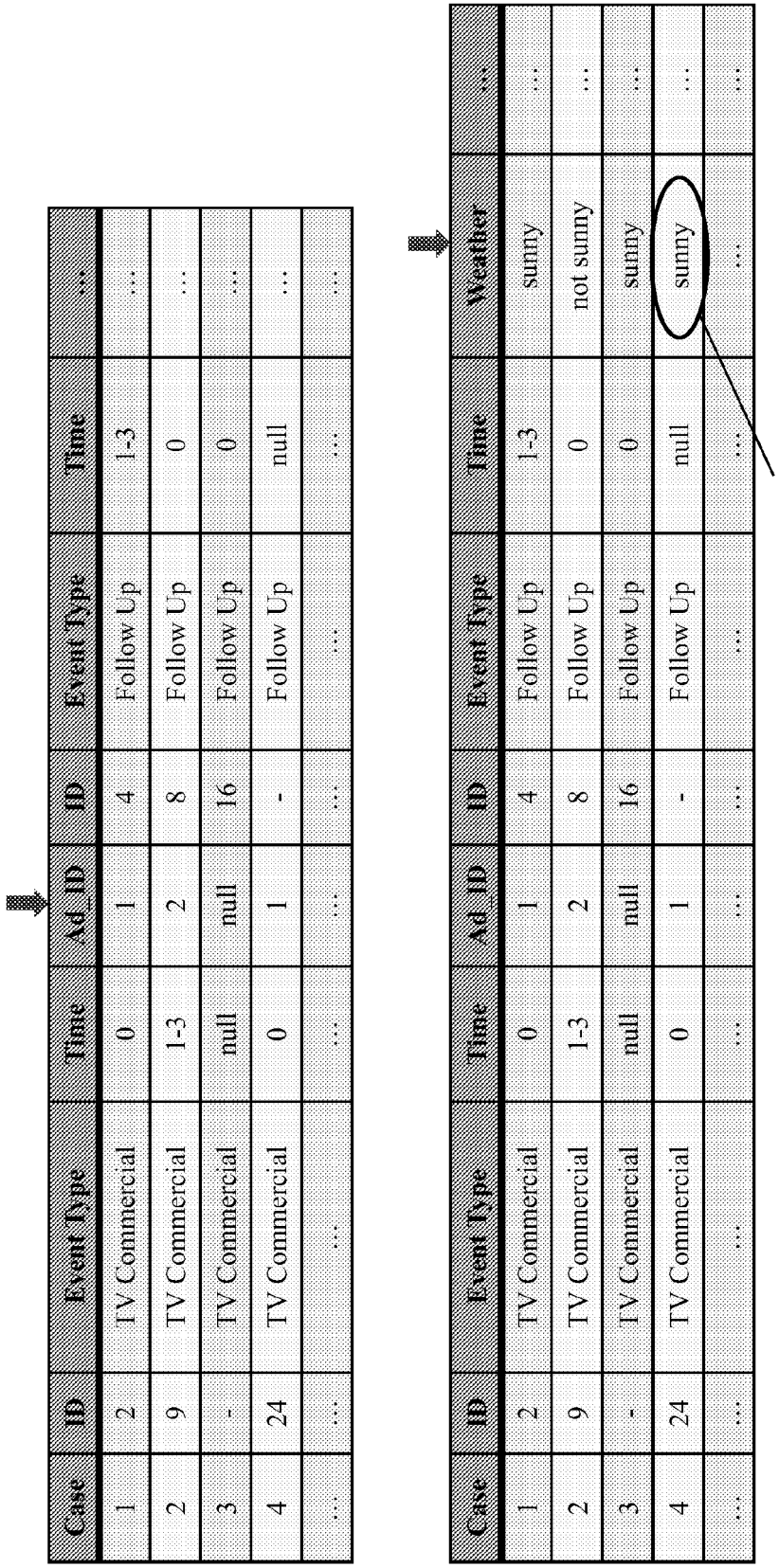
FIG. 8 illustrates an example of context addition to case sets.

As illustrated in FIG. 8, in case of null values for generic context variables, the value for the context variable is randomly sampled from a known prior distribution (for example, P(Weather=sunny)=0.8 and P(Weather=not sunny)=0.2) or a normal distribution. This step is important for learning a network that correctly considers the prior distribution over the (weather) variable and for the correctness of inference tasks that include generic context variables. For example, in the case where the weather is only be tracked if a follow up occurs, for all cases where "Follow Up" is null, there is no value for weather. However, the weather in this case is just unknown, but it is not "not defined". Therefore, the value for the context variable is randomly sampled from a known prior distribution or a normal distribution.

Figure 9:
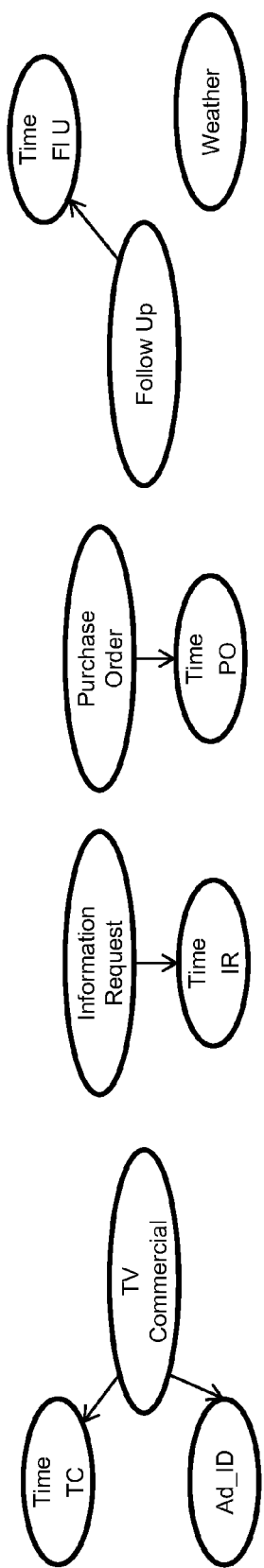
FIG. 9 illustrates example directed edges from event occurrence variables to the corresponding time variables.

An embodiment then learns the probabilistic event networks from the case sets. Event occurrences are defined as binary static (in contrast to dynamic) variables (that is, with domain {false; true} and without a time index as for example in time-based Bayesian networks or Hidden Markov Models). In order to learn probabilistic dependencies between variables an approach based on Bayesian network learning is chosen, for example a random-restart hill climber over the space of legal network structures is chosen, whereas each structure is evaluated against the final case set based on the Bayesian information criterion (BIC). A structure with the minimum number of edges is chosen as the initial structure. It should be noted again that alternative optimization approaches such as simulated annealing could be chosen for searching the space of legal network structures. The BIC criterion penalizes non-sparse network structures and thereby reduces complexity. The legal structures of probabilistic event networks include for each event occurrence variable a directed edge to the corresponding time variable as well as to all of its specific context variables (not the generic context variables that are tracked at the occurrence of this event). Thus, in this example the dependencies illustrated in FIG. 9 are to be included.

An embodiment may infer probabilistic statements from PE nets. For example, suppose it is Feb. 17, 2010, and the sales staff that usually follows up with the clients did not report to the manager if he followed up with a particular customer (uncertain data). If it is known that on Feb. 6, 2010, the company did a TV commercial and there was an information request from this customer Feb. 16, 2010, an embodiment may employ these facts to infer the chance that the customer will re-order paper in this month, when the customer will most probably re-order this month, and if it would be better to follow up with the customer on a sunny day (because the customer might be in a better mood—context variable "weather").

Figure 10:
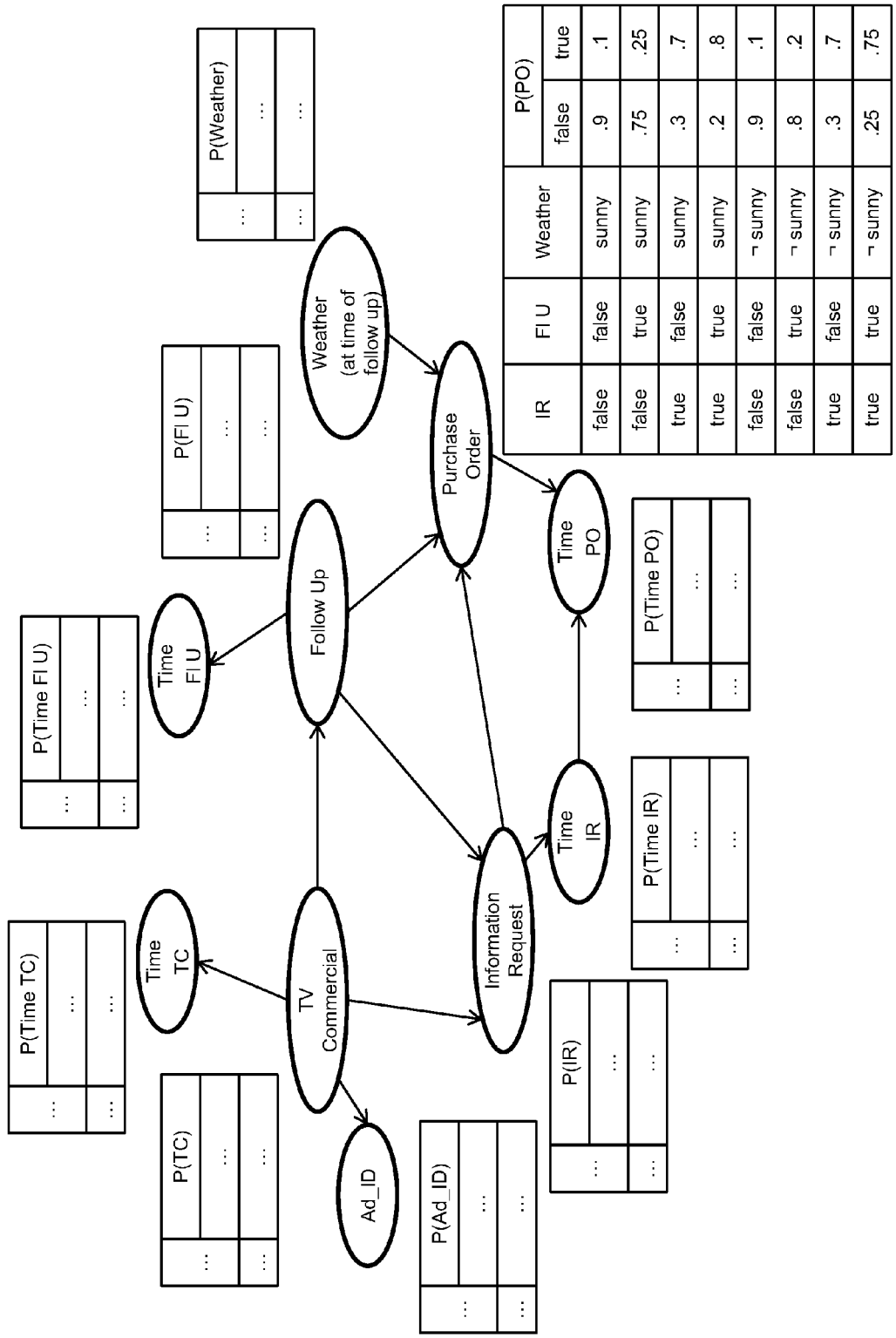
FIG. 10 illustrates an example PE net and inferred probabilistic statements regarding an example event.

An embodiment may construct the example PE net illustrated in FIG. 10. Here, for simplicity only a probability table for purchase order is shown. It can be readily seen that, based on the event data available, an embodiment provides a manager with the forecast that the customer will reorder paper in the month, and it is especially likely if a follow up is made while it is sunny. Here, when there has been an information request and a follow up is made on a sunny day, purchase order p=0.8, whereas when there has been an information request and a follow up is made when it is not sunny, purchase order p=0.75. Thus, it would be best for a follow to happen on a sunny day.

Figure 11:
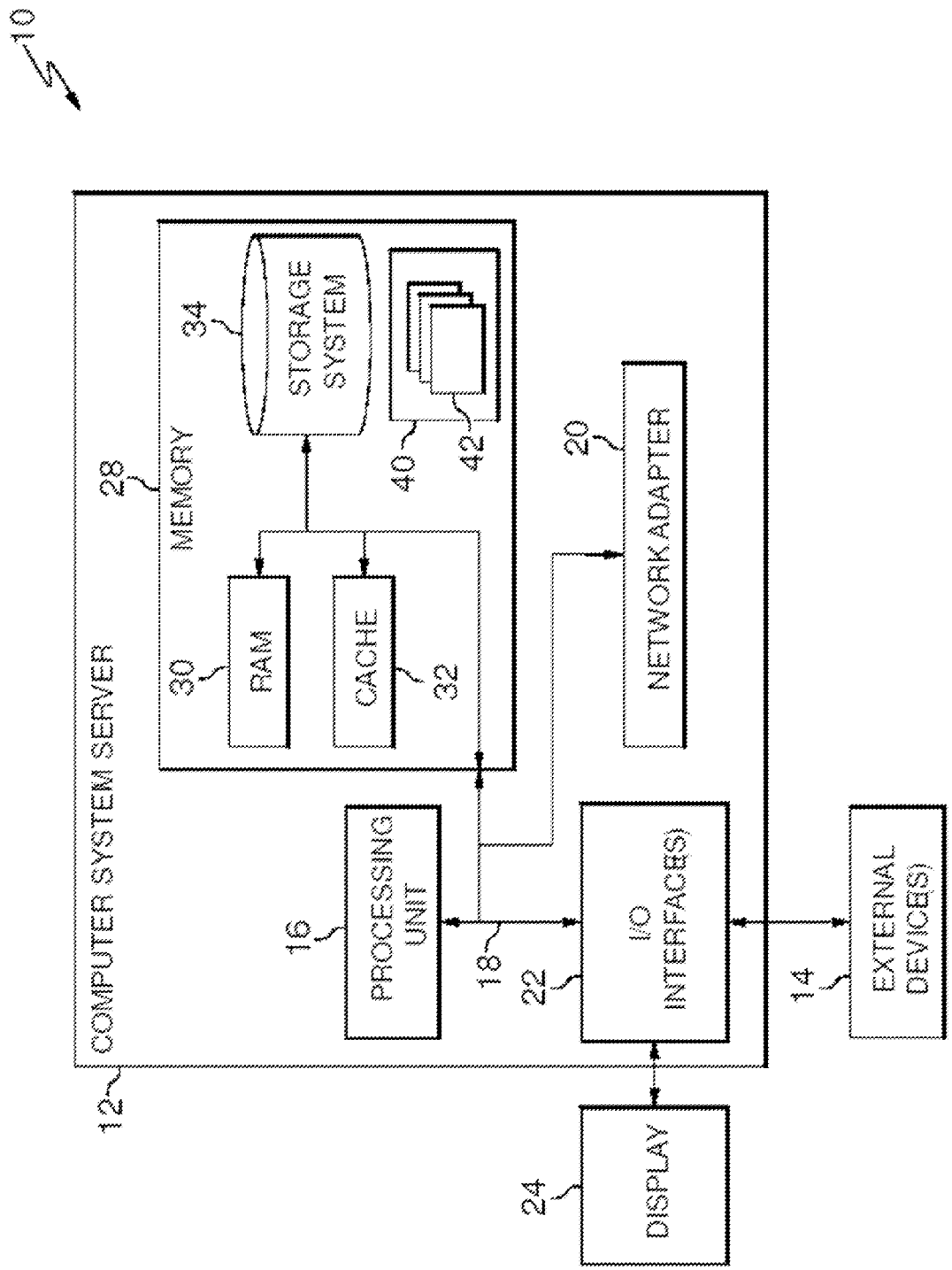
FIG. 11 illustrates an example computer system/server.

Referring now to FIG. 11, it will be readily understood that embodiments may be implemented using any of a wide variety of devices or combinations of devices. A schematic of an example of a computing node is shown in FIG. 11. Computing node 10 is only one example of a suitable computing node and is not intended to suggest any limitation as to the scope of use or functionality of embodiments described herein. Regardless, computing node 10 is capable of being implemented and/or performing any of the functionality set forth herein.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, et cetera; one or more devices that enable a user to interact with computer system/server 12; and/or any devices (for example, network card, modem, et cetera) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, et cetera.

As will be appreciated by one skilled in the art, aspects may be embodied as a system, method or computer program product. Accordingly, aspects of the present invention may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects of the present invention may take the form of a computer program product embodied in at least one computer readable medium(s) having computer readable program code embodied thereon.

Any combination of at least one computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-signal medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described with reference to figures of methods, apparatus (systems) and computer program products according to embodiments. It will be understood that portions of the firgures can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method for predicting events from event log data, comprising:
    constructing at least one probabilistic event network using training data, the training data being multivariate point process data, said constructing comprising:
        receiving the training data;
        generating co-occurrence scores for pairs of event classes represented in the training data;
        the co-occurrence scores indicating a correlation between two variables included in the pairs of event classes;
        wherein a co-occurrence score for at least one of the pairs of event classes is based upon a correlation of time between the two variables included in the at least one of the pairs of event classes;
        wherein the co-occurrence score for at least one of the pairs of event classes is based upon an order of events between the two variables included in the at least one of the pairs of event classes;
        generating at least one case set comprising correlated events for at least a portion of the pairs of event classes using the co-occurrence scores; and
        constructing the at least one probabilistic event network from the at least one case set;
    receiving a query regarding at least one future event; and
    upon receiving the query, using the at least one probabilistic event network to infer a probabilistic statement regarding said at least one future event using a network inference mechanism.

2. The method of claim 1, further comprising: receiving additional data regarding at least one event occurrence; and
    updating said at least one probabilistic event network in response to receiving the additional data.

3. The method of claim 1, wherein said network inference mechanism is variable elimination.

4. The method of claim 1, wherein determining co-occurrence scores comprises applying at least one co-occurrence heuristic.

5. The method of claim 4, wherein said at least one co-occurrence heuristics includes at least one co-occurrence heuristic based on clustering.

6. The method of claim 4, wherein determining co-occurrence scores further comprises applying a plurality of co-occurrence heuristics.

7. The method of claim 6, wherein said plurality of co-occurrence heuristics comprise at least one of directed co-occurrence scores and at least one of undirected co-occurrence scores.

8. The method of claim 1, wherein the training data comprises data regarding event occurrences defined as binary static variables.

9. The method of claim 7, further comprising adding a time variable to information regarding an event occurrence upon receiving information regarding the event occurrence.

10. The method of claim 1, wherein said at least one probabilistic event network defines default dependencies between event occurrences in said training data and at least one of: corresponding time variables and corresponding specific context variables.

11. The method of claim 10, wherein the default dependencies are derived from the at least one case set.

12. The method of claim 1, wherein the probabilistic statement inferred comprises a probability of occurrence for said at least one future event.

13. A computer program product for predicting events from event log data, comprising:
    a non-signal computer readable storage medium having computer readable program code embodied therewith, the computer readable program code comprising:
    computer readable program code configured to construct at least one probabilistic event network using training data, the training data being multivariate point process data, wherein to construct further comprises:
        receiving the training data;
        generating co-occurrence scores for pairs of event classes represented in the training data;
        the co-occurrence scores indicating a correlation between two variables included in the pairs of event classes;
        wherein a co-occurrence score for at least one of the pairs of event classes is based upon a correlation of time between the two variables included in the at least one of the pairs of event classes;
        wherein the co-occurrence score for at least one of the pairs of event classes is based upon an order of events between the two variables included in the at least one of the pairs of event classes;
        generating at least one case set comprising correlated events for at least a portion of the pairs of event classes using the co-occurrence scores; and
        constructing the at least one probabilistic event network from the at least one case set;
    computer readable program code configured to receive a query regarding at least one future event; and
    computer readable program code configured to, upon receiving the query, use the at least one probabilistic event network to infer a probabilistic statement regarding said at least one future event using a network inference mechanism.

14. The computer program product of claim 13, further comprising:
    computer readable program code configured to receive additional data regarding at least one event occurrence; and
    computer readable program code configured to update said at least one probabilistic event network in response to receiving the additional data.

15. The computer program product of claim 13, wherein said network inference mechanism is variable elimination.

16. The computer program product of claim 13, wherein determining co-occurrence scores comprises applying at least one co-occurrence heuristic.

17. The computer program product of claim 16, wherein said at least one co-occurrence heuristics includes at least one co-occurrence heuristic based on clustering.

18. The computer program product of claim 16, wherein determining co-occurrence scores further comprises applying a plurality of co-occurrence heuristics.

19. The computer program product of claim 18, wherein said plurality of co-occurrence heuristics comprise at least one of directed co-occurrence scores and at least one of undirected co-occurrence scores.

20. The computer program product of claim 13, wherein the training data comprises data regarding event occurrences defined as binary static variables.

21. The computer program product of claim 20, further comprising computer readable program code configured to add a time variable to information regarding an event occurrence upon receiving information regarding the event occurrence.

22. The computer program product of claim 13, wherein said at least one probabilistic event network defines default dependencies between event occurrences in said training data and at least one of: corresponding time variables and corresponding specific context variables.

23. The computer program product of claim 22, wherein the default dependencies are derived from the at least one case set.

24. The computer program product of claim 13, wherein the probabilistic statement inferred comprises a probability of occurrence for said at least one future event.

25. A system for predicting events from event log data, comprising:
   at least one processor; and
   a memory device operatively connected to the at least one processor;
   wherein, responsive to execution of program instructions accessible to the at least one processor, the at least one processor is configured to:
   construct at least one probabilistic event network using training data, the training data being multivariate point process data, wherein to construct comprises:
   receiving the training data;
   generating co-occurrence scores for pairs of event classes represented in the training data;
   the co-occurrence scores indicating a correlation between two variables included in the pairs of event classes;
   wherein a co-occurrence score for at least one of the pairs of event classes is based upon a correlation of time between the two variables included in the at least one of the pairs of event classes;
   wherein the co-occurrence score for at least one of the pairs of event classes is based upon an order of events between the two variables included in the at least one of the pairs of event classes;
   generating at least one case set comprising correlated events for at least a portion of the pairs of event classes using the co-occurrence scores; and
   constructing the at least one probabilistic event network from the at least one case set;
   receive a query regarding at least one future event; and
   upon receiving the query, use the at least one probabilistic event network to infer a probabilistic statement regarding said at least one future event using a network inference mechanism.

26. The system of claim 25, wherein said network inference mechanism is variable elimination.

27. The system of claim 25, wherein generating co-occurrence scores further comprises applying a plurality of co-occurrence heuristics.

28. The system of claim 27, wherein said plurality of co-occurrence heuristics includes at least one co-occurrence heuristic based on clustering.

29. The system of claim 25, wherein the probabilistic statement inferred comprises a probability of occurrence for said at least one future event.

* * * * *